(12) United States Patent
Trewiler et al.

(10) Patent No.: US 6,969,826 B2
(45) Date of Patent: Nov. 29, 2005

(54) WELDING PROCESS

(75) Inventors: Gary Edward Trewiler, Loveland, OH (US); Daryl Peacock, Cincinnati, OH (US); William Henry Harrison, Cleves, OH (US)

(73) Assignee: General Electric Company, Schenectady, NY (US)

( * ) Notice: Subject to any disclaimer, the term of this patent is extended or adjusted under 35 U.S.C. 154(b) by 33 days.

(21) Appl. No.: 10/709,051

(22) Filed: Apr. 8, 2004

(65) Prior Publication Data

US 2005/0224487 A1   Oct. 13, 2005

(51) Int. Cl.$^7$ .............................................. B23K 9/167
(52) U.S. Cl. .................... 219/137 R; 29/889.1; 219/75
(58) Field of Search ............................ 219/137 R, 75; 29/889.1

(56) References Cited

U.S. PATENT DOCUMENTS

| | | | |
|---|---|---|---|
| 5,400,491 A | * | 3/1995 | Yaworsky et al. .......... 29/33 R |
| 5,804,792 A | | 9/1998 | Paskell ...................... 219/137 |
| 6,607,114 B2 | | 8/2003 | Reser et al. ............... 228/49.1 |
| 6,664,508 B1 | | 12/2003 | Johnson et al. ............. 219/137 |

OTHER PUBLICATIONS

Edison Welding Institute, INSIGHTS Materials Joining Newsletter; Spring 2003, vol. 16, No. 2; "EWI Develops Full-Scale Riser Fatigue Test Facility in Columbus, Ohio".

* cited by examiner

*Primary Examiner*—Clifford C. Shaw
(74) *Attorney, Agent, or Firm*—David L. Narciso; Gary M. Hartman; Domenica N. S. Hartman

(57) ABSTRACT

A process for repairing a compressor rear frame of a gas turbine engine. The process entails removing a seal flange from the inner casing wall of the frame to define an annular face on the casing wall, and fabricating a replacement flange to have an annular face with a radial width greater than the radial width of the annular face of the casing wall. The faces of the flange and wall are mated to form a joint, a penetration-enhancing flux is deposited adjacent the joint, and a single-pass gas tungsten arc welding operation is performed to form a root weldment that extends completely through the joint. The flux is then removed and a gas tungsten arc welding operation is performed to deposit a filler on the root weldment and form a second weldment that completely overlays but does not penetrate through the root weldment.

20 Claims, 4 Drawing Sheets

US 6,969,826 B2

WELDING PROCESS

BACKGROUND OF INVENTION

1. Field of the Invention

The present invention generally relates to welding equipment and processes. More particularly, this invention relates to an arc welding process for repairing a compressor rear frame (CRF) of a gas turbine engine.

2. Description of the Related Art

FIG. 1 schematically represents a compressor rear frame (CRF) 10 of the CF6-50 high-bypass gas turbine engine manufactured by the General Electric Company. The frame 10 can be seen as comprising inner and outer casing walls 12 and 14 interconnected by radially-extending struts 16. A support flange 18 located at the forward end of the inner casing wall 12 is adapted to carry a stationary seal, referred to as the compressor discharge pressure (CDP) seal (not shown). When the frame 10 is installed in an engine, the CDP seal is positioned in close proximity to a seal disk (not shown) mounted on a shaft that interconnects the high pressure turbine and compressor of the engine. The CDP seal and seal teeth on the seal disk cooperate to create a tortuous flowpath between the inner casing wall 12 and the rotating shaft, thereby minimizing the amount of compressor discharge air bypassing the compressor downstream of the seal.

The support flange 18 inevitably requires replacement as a result of weld repairs performed on the frame 10 that cause distortion, resulting in the movement of the flange 18 to the extent that the dimensional limits of the flange 18 cannot be recovered. For this purpose, the inner casing wall 12 is typically machined to remove the flange 18, and a rough-machined annular-shaped flange is welded in its place. In this manner, the outer casing wall 14 and the bulk of the inner casing wall 12 can be salvaged. In addition to material considerations, which in this case is typically a nickel-base superalloy such as Inconel 718, suitable weld processes for welding the replacement flange 18 are dependent on the wall thickness of the inner casing wall 12 and flange 18 at the point where the weld is to be performed. Thin walls of up to approximately 0.090 inch (about 2.3 mm) can be welded by gas tungsten arc welding (GTAW) using a single-pass butt joint weld configuration. However, at the location where it is most practical to make the cut for removing a worn flange 18, the inner casing wall 12 of the CF6-50 engine has a nominal wall thickness of about 0.140 inch (about 3.56 mm). Under such circumstances, electron beam (EB) welding would typically be considered in combination with essentially the same single-pass butt joint configuration used with repairs preformed by GTAW. However, due to the set back of the CDP seal flange 18 inside the frame 10 and the proximity of the outer casing wall 14, EB welding cannot be used to perform this type of weld repair on the CF6-50 frame 10.

In view of the above, multiple-pass GTAW techniques have been developed, an example of which is represented in FIG. 2 as a detail of the seal flange 18 depicted in FIG. 1. As this approach is represented in FIG. 2, a weldment 20 is built up with four welding passes. Because of the limited penetration possible with conventional GTAW techniques, a butt joint is not used. Instead, a special joint preparation must be performed, such as the V-shaped channel 22 seen in FIG. 2. The requirement for multiple passes to build up the weldment 20 within the channel 22 is less than optimal in that performing such a repair is time consuming and often results in part distortions that can spawn a series of unplanned repairs. Weld-induced distortion exacerbates the existing tendency for the inner casing wall 12 to be out-of-round, which itself makes it difficult to perform the weld without necessitating machining of the wall 12 and flange 16 to the extent that the resulting wall thickness is below the allowable range.

A modified GTAW process, referred to as penetration-enhanced gas tungsten arc welding (PE-GTAW), has been recently developed that makes possible the welding of walls in excess of 0.090 inch. One such process makes use of a weld penetration-enhancing flux disclosed in U.S. Pat. No. 6,664,508 to Johnson et al. The flux, commercially available under the name Ni-139 from the Edison Welding Institute, Inc. (EWI), is disclosed by Johnson et al. as containing titanates and one or more transition metal oxides. It would be desirable if a single-pass GTAW processing utilizing a penetration-enhancing flux of the type disclosed by Johnson et al. could be adapted for use in welding compressor rear frames of gas turbine engines, and particularly the CRF of the CF6-50 engine.

SUMMARY OF INVENTION

The present invention provides a weld process suitable for repairing compressor rear frames of gas turbine engines, and more particularly welding a new seal flange to a compressor rear frame in a single pass using GTAW. Using a modified PE-GTAW process, including welding equipment, welding parameters and a weld joint configuration adapted for use with the process, the seal flange of a compressor rear frame can be replaced without causing undue distortion of the frame. In addition, the weld joint configuration is adapted to accommodate out-of-round conditions of the frame. Finally, the process provides for subsequent cosmetic welds to be performed, during which filler wire may be deposited to achieve dimensional and mechanical property requirements for the frame and the repair.

Compressor rear frames of the type repaired by the process of this invention generally comprise a cylindrically-shaped outer casing wall that substantially circumscribes a cylindrically-shaped inner casing wall on which the flange to be replaced is located. The process generally entails removing the flange from the inner casing wall to define an annular face on the inner casing wall, and fabricating a replacement flange to have an annular face with a width that is greater than the width of the annular face of the inner casing wall. The annular faces of the replacement flange and the inner casing wall are then mated to define a joint therebetween. After depositing a penetration-enhancing flux on adjacent surfaces of the replacement flange and the inner casing wall separated by the joint, a single-pass gas tungsten arc welding operation is performed by generating an electric arc between an electrode and the joint between the adjacent surfaces of the replacement flange and the inner casing wall. The welding operation is carried out to form a root weldment that extends completely through the joint to metallurgically join the replacement flange to the inner casing wall.

According to a preferred aspect of the invention, substantially all of the penetration-enhancing flux that remains following the welding operation is removed, and a second single-pass gas tungsten arc welding operation is performed to smooth the root weldment. The second operation may deposit a filler on the root weldment and form a second weldment that does not penetrate through the root weldment. The purpose of the second weldment includes bringing the dimensions of the final weld joint within accepted ranges. Using a generally conventional GTAW process for this purpose, machining of the final weldment can be avoided yet suitable mechanical properties, including fatigue strength, can be achieved for the frame.

From the above, the repair process of the present invention avoids the previous requirement for a special joint preparation to achieve full penetration of a GTAW weldment through a thick wall, such as the inner casing wall of a compressor rear frame. Furthermore, only two weld passes are necessary to replace the seal flange of a compressor rear frame, thereby reducing the risk of unacceptable distortion of the frame. Finally, the repair process of this invention makes use of a joint configuration in which the replacement flange is wider than the inner casing wall so as to accommodate out-of-round conditions of the casing wall. In this manner, machining is avoided that might otherwise reduce the wall thickness below the allowable range.

Other objects and advantages of this invention will be better appreciated from the following detailed description.

DETAILED DESCRIPTION

Figure 2:
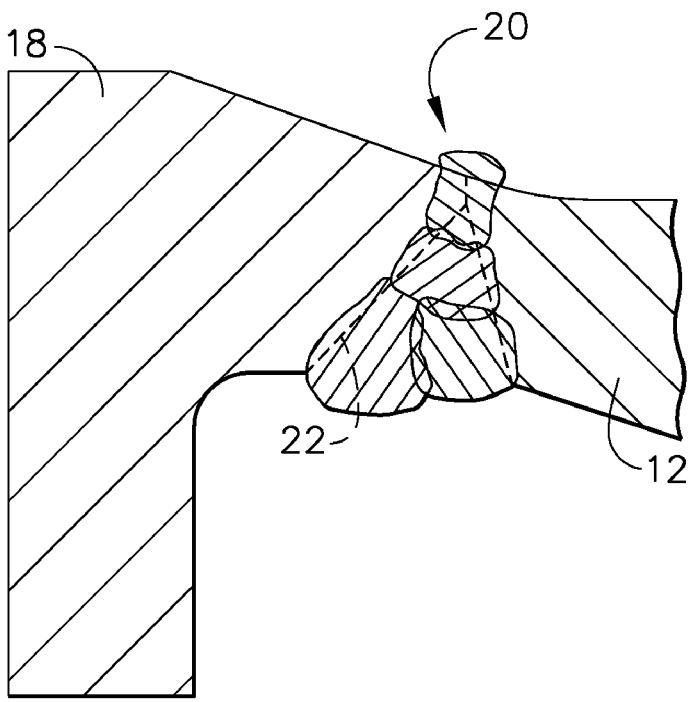
FIG. 2 represents the result of performing a prior art multiple-pass GTAW process when welding a replacement flange on a compressor rear frame of the type shown in FIG. 1.
Figure 3:
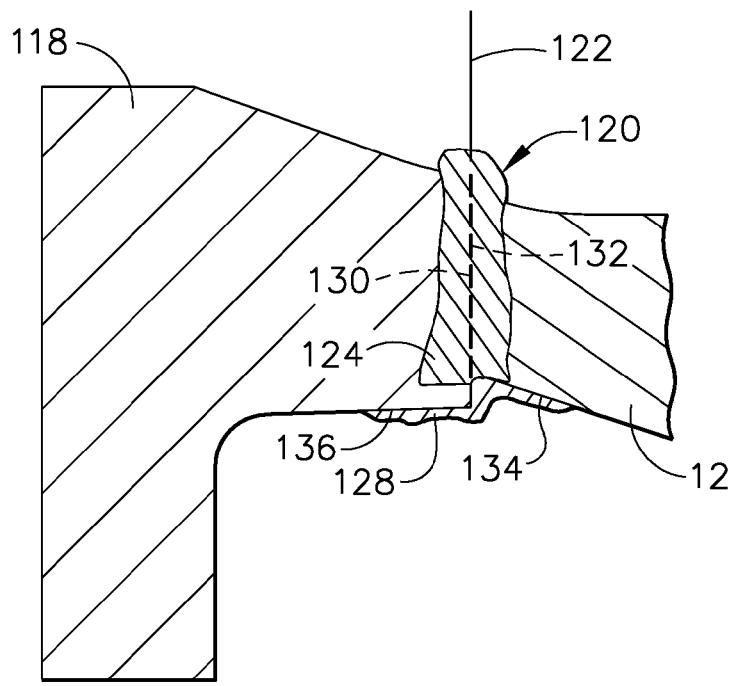
FIGS. 3 and 4 represent two steps of the weld process of this invention when welding a replacement flange on a compressor rear frame of the type shown in FIG. 1.
Figure 4:
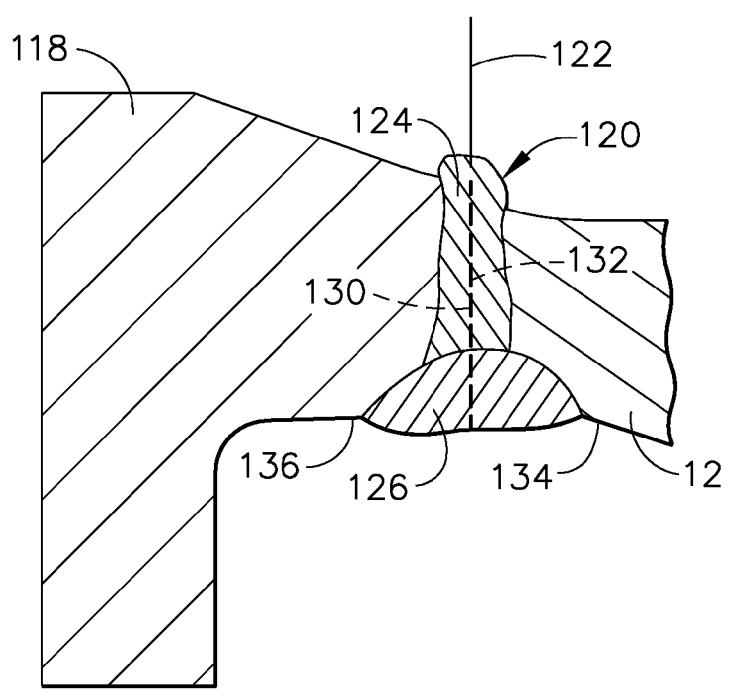

FIGS. 3 and 4 show a weld joint 120 formed between a replacement seal flange 118 and the forward end of an inner casing wall of a compressor rear frame (CRF). Similar to FIG. 2, FIGS. 3 and 4 are represented as details of the compressor rear frame 10 of FIG. 1, and therefore the inner casing wall is identified with reference number 12. The compressor rear frame 10 is preferably formed of a nickel-base superalloy, such as Inconel 718, though the invention is also applicable to welding of other components formed of various materials and for which weld penetration and quality are critical for achieving acceptable mechanical properties, including strength and fatigue life. As discussed in reference to FIG. 1, the frame 10 comprises a cylindrically-shaped inner casing wall 12 and a cylindrically-shaped outer casing wall 14 that substantially circumscribes the inner casing wall 12. The flange 118 of FIGS. 3 and 4 replaces the compressor discharge pressure (CDP) seal flange 18 of FIG. 1, which can be seen to project radially inward from the forward end of the inner casing wall 12. The original and replacement seal flanges 18 and 118 are substantially normal to the longitudinal axis of the inner casing wall 12. In FIG. 3, the original flange 18 has been removed from the inner casing wall 12 by making a cut at a location axially inward from the flange 18, so that the flange 18 and a contiguous portion of the inner casing wall 12 were removed together. The replacement flange 118 is fabricated to be similar in shape to the original flange 18, and has an annular face 132 that abuts an annular face 130 of the inner casing wall 12 formed when the original flange 18 was removed.

Figure 5:
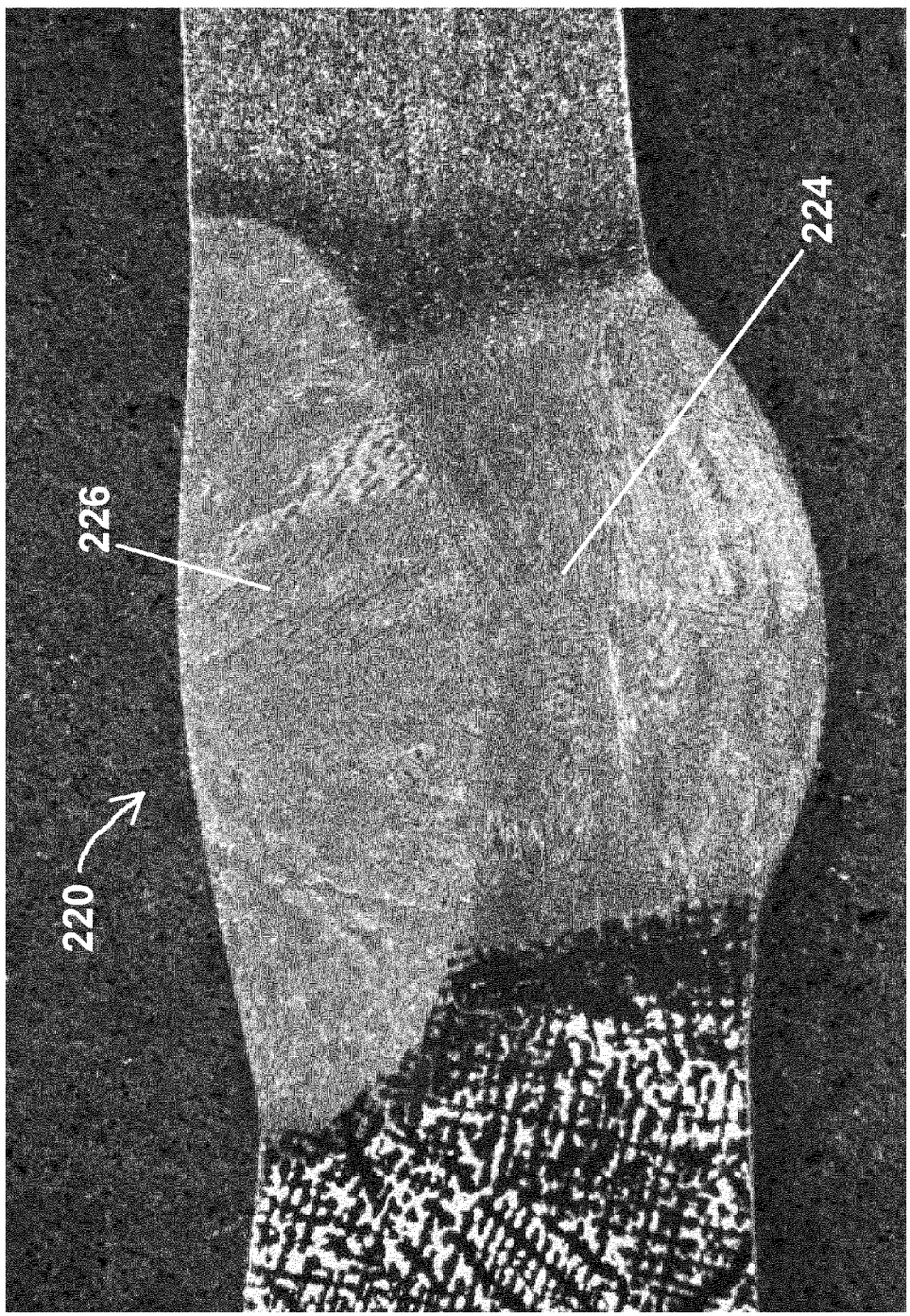
FIG. 5 is a cross-sectional scanned image of a weldment formed by performing a single-pass cosmetic GTAW process on a weldment of the type represented in FIG. 4, in which the flux used in the PE-GTAW process was completely removed before the single-pass cosmetic GTAW process was performed in accordance with a preferred aspect of the present invention.

The weld joint 120 represented in FIG. 3 is shown in a condition following a single weld pass using a welding process in accordance with the present invention. In FIG. 3, the weld joint 120 comprises a root weldment 124 only. In a preferred embodiment, a cosmetic weld pass is subsequently performed to form a second weldment 126 shown in FIG. 4. The second weldment 126 completely overlays but does not penetrate through the root weldment 124, as will be discussed in further detail with reference to FIGS. 5 and 6.

The original weld plane 122 defined by mating of the annular faces 130 and 132 of the inner casing wall 12 and replacement flange 118, respectively, is identified in FIGS. 3 and 4. The annular faces 130 and 132 can be seen as being mated in a configuration commonly known as a square butt joint, in which the weld plane 122 is substantially perpendicular to the adjacent surfaces 134 and 136 of the wall 12 and flange 118 on the side from which the weld operation will be performed. From this it is evident that a special weld preparation, such as the V-shaped channel 22 depicted in FIG. 2, is not required to perform the weld operation of this invention. Instead of the channel 22 of FIG. 2, the faces 130 and 132 are mated to form a continuous, gap-free joint along the entire weld plane 122.

Figure 1:
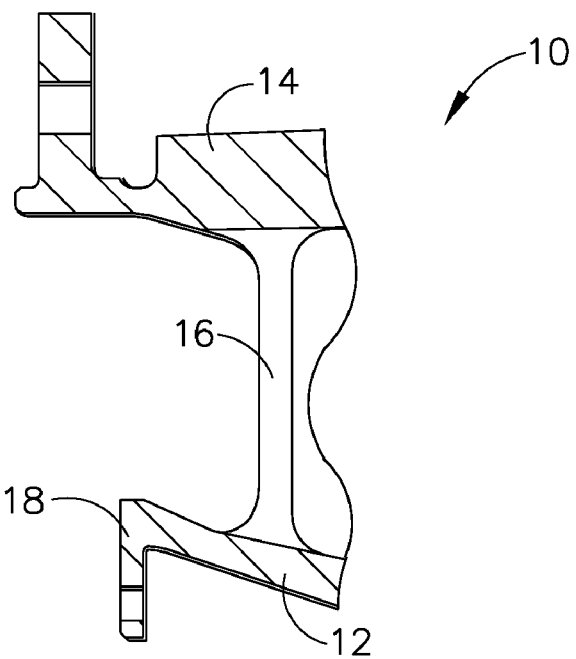
FIG. 1 schematically represents a longitudinal cross-sectional view of a compressor rear frame of a type that can be repaired using the process of the present invention.

As discussed in reference to FIGS. 1 and 2, the inner casing wall 12 of the CF6-50 engine has a nominal thickness of about 0.140 inch (about 3.56 mm) measured in the radial direction of the frame 10 and wall 12. From FIG. 3, it is evident that the face 132 of the replacement flange 118 abutting the face 130 of inner casing wall 12 has a thickness (radial width) significantly greater than that of the face 130. For example, the thickness of the replacement flange 118 at the face 132 can be about 0.185 inch (about 4.6 mm), or roughly about 50% thicker than the thickness of the wall 12 adjacent its face 130. The greater thickness of the flange face 132 allows for mismatch between the faces 130 and 132 that may occur as a result of the inner casing wall 12 being out-of-round due to service and/or repair-induced distortions. In turn, the single-pass welding process employed by this invention is able to penetrate the entire thickness of the weld plane 122, producing the root weldment 124 without adverse effects that might result from the markedly different thicknesses of the faces 130 and 132.

Prior to performing the welding operation to form the root weldment 124, the casing wall 12 and the replacement flange 118 are preferably tack welded together using a manual GTAW technique. The tack welding operation may employ a filler material that is deposited intermittently along the circumference of the wall 12 to join the faces 130 and 132 of the wall 12 and flange 118 at their adjacent surfaces 134 and 136. In the present case in which the casing wall 12 and replacement flange 118 are formed of Inconel 718, a suitable filler material is AMS 5832, which is the Aerospace Materials Specification that covers Inconel 718 as well as several other commercially-available alloys. Other suitable filler materials are foreseeable, depending on the materials being joined. The tack welds need only be of sufficient size and number to secure the wall 12 and flange 118 together for undergoing the weld operation described below.

The preferred welding process of this invention is a single-pass penetration-enhanced gas tungsten arc welding (PE-GTAW) process that utilizes a penetration-enhancing flux. A preferred flux is disclosed in U.S. Pat. No. 6,664,508 to Johnson et al., and commercially available under the name Ni-139 from the Edison Welding Institute, Inc. (EWI). The content of Johnson et al. relating to the composition of the penetration-enhancing flux is incorporated herein by reference. This flux is disclosed as containing titanates and one or more transition metal oxides. As represented in FIG. 3, a uniform coating 128 of the flux is deposited on the surfaces 134 and 136 of the wall 12 and flange 118, which are on the side of the joint from which the welding operation will be performed. Notably, these surfaces 134 and 136 are located within the interior of the inner casing wall 12, such that electron beam (EB) welding is impractical because of space constraints. Welding parameters for the PE-GTAW process include the following:

| | |
|---|---|
| Current: | 210 to 215 Amps (DC, straight polarity) |
| Voltage: | 9.7–9.9 V |
| Electrode: | 3/32 inch (0.24 mm) diameter |
| Travel Speed: | 9.5 ipm (about 24 cm/minute) |
| Filler Material: | None |
| Shielding gas: | Argon |
| Shielding gas flow rate: | 25 to 35 cfh (0.71 to 0.99 $m^3$/h) |
| Torch type: | HW27 |

Following the welding operation described above for forming the root weldment 124 depicted in FIG. 3, the welded assembly preferably undergoes a cosmetic welding operation in which the surfaces 134 and 136 undergo a second welding pass, the result of which is depicted in FIG. 4. In contrast to the PE-GTAW process described above for producing the root weldment 124, this second welding operation does not utilize a penetration-enhancing flux. In fact, the presence of such a flux during the cosmetic weld operation yields undesirable results, as will be explained below. In further contrast to the PE-GTAW process, the cosmetic weld operation may employ a filler material that is deposited to form a second weldment 126. This second cosmetic weldment 126 produces not only a desirable cosmetic appearance to the final weld joint 120, but also improves the surface geometry of the weld joint 120. Smoothing of the weld joint 120 facilitates any subsequent machining of the flange 118 necessary to restore the original flange-wall transition. Suitable filler materials will depend on the materials being joined. As with the tack weld discussed above, a suitable filler material is AMS 5832 if the casing wall 12 and replacement flange 118 are formed of Inconel 718.

A scanned image of a weld joint 220 produced using the weld process described above is shown in FIG. 5. The weld joint 220 can be seen as comprising a root weldment 224 overlaid by a cosmetic weldment 226. Importantly, the cosmetic weldment 226 completely covers, but does not penetrate through, the root weldment 224. More particularly, the cosmetic weldment 226 can be seen to penetrate less than half the thickness of the weld joint 220. Specific to the weld joint 120 for the CRF of the CF6-50 engine, the cosmetic weldment 126 preferably penetrates not more than 30% of the thickness of the weld joint 120, such as about 25% of the thickness of the weld joint 120.

Figure 6:
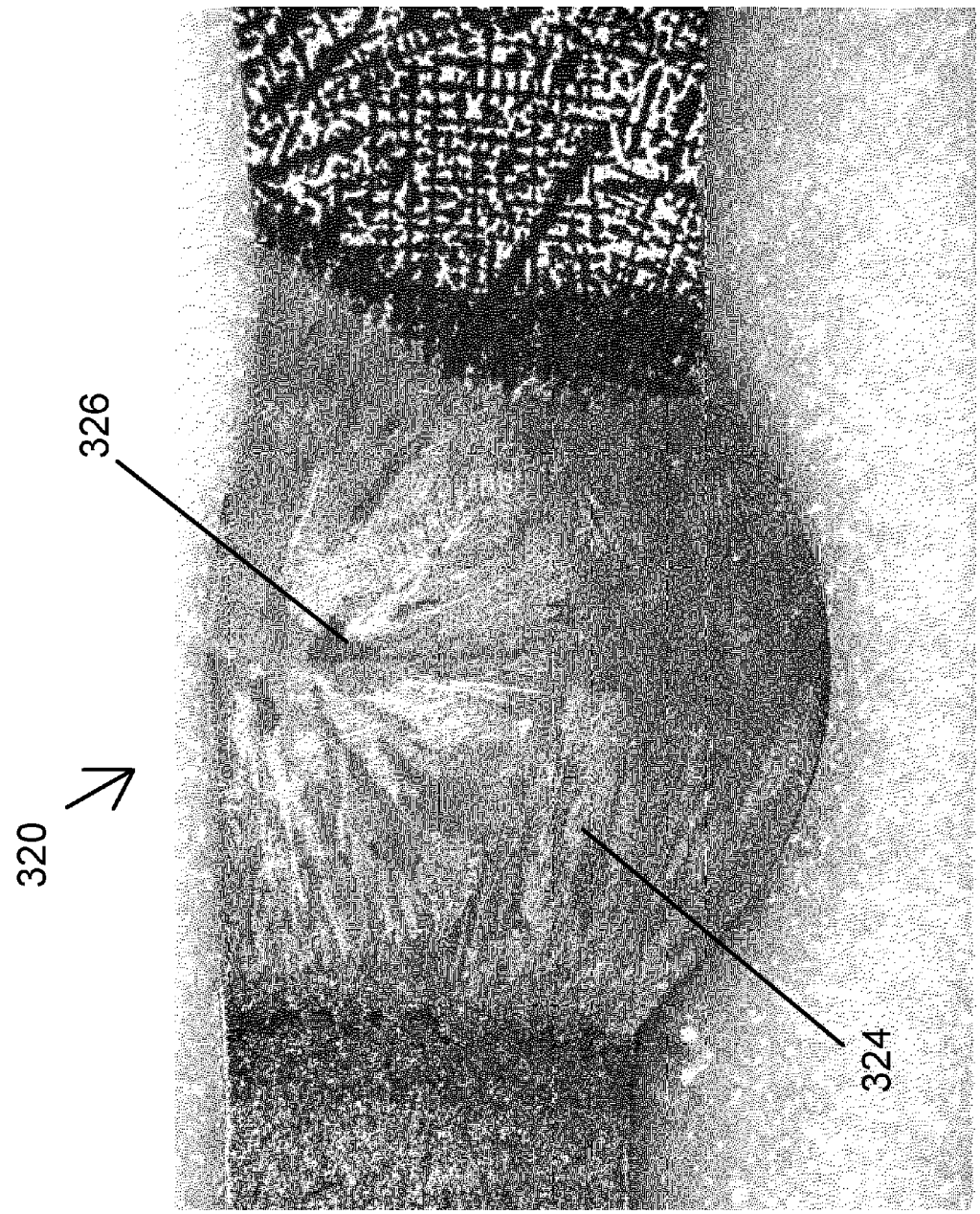
FIG. 6 is a cross-sectional scanned image of a weldment formed by performing a single-pass cosmetic GTAW process on a weldment of the type represented in FIG. 4, but in which a flux used in the PE-GTAW process was not adequately removed before the single-pass cosmetic GTAW process was performed.

The adverse effect that a penetration-enhancing flux has on the cosmetic weldment and the overall quality of the weld joint can be seen from FIG. 6, which shows a weld joint 320 produced using the same weld processes described above for the weld joint 220 of FIG. 5, but with residual penetration-enhancing flux present during the cosmetic weld operation. As with the weld joint 220 of FIG. 5, the weld joint 320 of FIG. 6 comprises a root weldment 324 and a cosmetic weldment 326. However, the cosmetic weldment 326 does not completely cover the root weldment 324, and penetrates more than half the thickness of the root weldment 324. Disadvantages of the weld joint 320 of FIG. 6 include difficulty with machining and undercutting of the root weldment 324 at the surface, reducing the tensile and fatigue strength of the weld joint 220.

While the invention has been described in terms of a preferred embodiment, it is apparent that other forms could be adopted by one skilled in the art. Therefore, the scope of the invention is to be limited only by the following claims.

What is claimed is:

1. A process for repairing a compressor rear frame of a gas turbine engine, the compressor rear frame comprising a cylindrically-shaped inner casing wall and a cylindrically-shaped outer casing wall that substantially circumscribes the inner casing wall, the inner casing wall having a flange adapted to carry a seal member, the process comprising the steps of:
    removing the flange from the inner casing wall to define an annular face on the inner casing wall, the annular face having a width;
    fabricating a replacement flange to have an annular face with a width that is greater than the width of the annular face of the inner casing wall;
    mating the annular faces of the replacement flange and the inner casing wall to define a joint therebetween;
    depositing a penetration-enhancing flux on adjacent surfaces of the replacement flange and the inner casing wall separated by the joint;
    performing a gas tungsten arc welding operation by generating an electric arc between an electrode and the joint between the adjacent surfaces of the replacement flange and the inner casing wall, the welding operation forming a root weldment that extends completely through the joint to metallurgically join the replacement flange to the inner casing wall;
    removing substantially all of the penetration-enhancing flux that remains following the welding operation; and then
    performing a single-pass gas tungsten arc welding operation to form a second weldment that does not penetrate through the root weldment.

2. The process according to claim 1, wherein the joint between the replacement flange and the inner casing wall is a square butt joint so that a gap is not present between the annular faces of the replacement flange and the inner casing wall following the mating step.

3. The process according to claim 1, wherein the annular faces of the replacement flange and the inner casing wall lie in a plane substantially normal to a longitudinal axis of the inner casing wall.

4. The process according to claim 1, wherein the width of the annular face of the inner casing wall is greater than 2.3 mm.

5. The process according to claim 1, wherein the width of the annular face of the inner casing wall is greater than 3 mm.

6. The process according to claim 1, wherein the width of the annular face of the replacement flange is about 50% greater than the width of the annular face of the inner casing wall.

7. The process according to claim 1, wherein the second weldment completely covers the root weldment.

8. The process according to claim 1, wherein the second weldment does not penetrate more than 30% through the thickness of the root weldment.

9. The process according to claim 1, wherein during the step of performing the single-pass gas tungsten arc welding operation to form the root weldment, automatic voltage control is employed to maintain a substantially constant arc length between the electrode and the joint between the adjacent surfaces of the replacement flange and the inner casing wall.

10. The process according to claim 1, wherein the adjacent surfaces of the replacement flange and the inner casing wall are located within an interior of the inner casing wall.

11. The process according to claim 1, wherein the flux contains titanates and one or more transition metal oxides.

12. A process for repairing a compressor rear frame of a gas turbine engine, the compressor rear frame comprising a cylindrically-shaped inner casing wall and a cylindrically-shaped outer casing wall that substantially circumscribes the inner casing wall, the inner casing wall having a seal flange that projects radially inward from one end of the inner casing wall so as to be substantially normal to a longitudinal axis of the inner casing wall, the seal flange being adapted to carry a seal member, the process comprising the steps of:

cutting the inner casing wall at a location axially inward from the seal flange so as to remove from the inner casing wall the seal flange and a contiguous portion of the inner casing wall and define an annular face on the inner casing wall, the annular face having a radial width in a direction normal to the longitudinal axis of the inner casing wall;

fabricating a replacement seal flange that is similar in shape to the seal flange and the contiguous portion removed from the inner casing wall, the replacement seal flange having an annular face with a radial width that is greater than the radial width of the annular face of the inner casing wall;

mating the annular faces of the replacement seal flange and the inner casing wall to define a square butt joint therebetween whereby a gap is not present between the annular faces of the replacement seal flange and the inner casing wall following the mating step;

depositing a penetration-enhancing flux on adjacent surfaces of the replacement seal flange and the inner casing wall separated by the square butt joint of the annular faces, the adjacent surfaces being located within an interior of the inner casing wall;

performing a single-pass gas tungsten arc welding operation by generating an electric arc between an electrode and the adjacent surfaces at the square butt joint, the welding operation forming a root weldment that extends completely through the square butt joint to metallurgically joins the replacement seal flange to the inner casing wall;

removing the penetration-enhancing flux; and then performing a single-pass gas tungsten arc welding operation to deposit a filler on the root weldment to form a second weldment that does not penetrate through the root weldment.

13. The process according to claim 12, wherein the annular faces of the replacement seal flange and the inner casing wall lie in a plane substantially normal to the longitudinal axis of the inner casing wall.

14. The process according to claim 12, wherein the radial width of the annular face of the inner casing wall is greater than 2.3 mm.

15. The process according to claim 12, wherein the radial width of the annular face of the inner casing wall is greater than 3 mm.

16. The process according to claim 12, wherein the radial width of the annular face of the replacement seal flange is about 50% greater than the radial width of the annular face of the inner casing wall.

17. The process according to claim 12, wherein the second weldment completely covers the root weldment.

18. The process according to claim 12, wherein the second weldment does not penetrate more than 30% through the thickness of the root weldment.

19. The process according to claim 12, wherein during the step of performing the single-pass gas tungsten arc welding operation to form the root weldment, automatic voltage control is employed to maintain a substantially constant arc length between the electrode and the adjacent surfaces at the square butt joint.

20. The process according to claim 12, wherein the flux contains titanates and one or more transition metal oxides.

* * * * *